(12) United States Patent  (10) Patent No.: US 7,982,332 B2
Nelson et al.  (45) Date of Patent: Jul. 19, 2011

(54) POWER DEVICE FOR A VEHICLE

(75) Inventors: Jody J. Nelson, W. Bloomfield, MI (US); Franz Nietfeld, Rochester Hills, MI (US)

(73) Assignees: Chrysler Group LLC, Auburn Hills, MI (US); Daimler AG, Stuttgart (DE)

( * ) Notice: Subject to any disclaimer, the term of this patent is extended or adjusted under 35 U.S.C. 154(b) by 341 days.

(21) Appl. No.: 11/608,428

(22) Filed: Dec. 8, 2006

(65) Prior Publication Data
US 2008/0136374 A1  Jun. 12, 2008

(51) Int. Cl.
*B60L 1/00* (2006.01)
*H02H 7/18* (2006.01)

(52) U.S. Cl. ............... 307/10.1; 307/9.1; 307/10.7

(58) Field of Classification Search ............ 307/9.1, 307/10.1, 10.7
See application file for complete search history.

(56) References Cited

U.S. PATENT DOCUMENTS

| | | | | |
|---|---|---|---|---|
| 4,347,543 | A * | 8/1982 | Frister et al. | 361/91.6 |
| 6,370,050 | B1 * | 4/2002 | Peng et al. | 363/98 |
| 7,012,822 | B2 | 3/2006 | Zhu et al. | |
| 2005/0047079 | A1 * | 3/2005 | Gasbarro et al. | 361/686 |
| 2005/0074989 | A1 * | 4/2005 | Pancheri | 439/35 |
| 2006/0085099 | A1 * | 4/2006 | Burlak et al. | 701/1 |
| 2008/0197810 | A1 * | 8/2008 | Ishikawa et al. | 320/135 |

* cited by examiner

*Primary Examiner* — Jared J Fureman
*Assistant Examiner* — Dru M Parries
(74) *Attorney, Agent, or Firm* — Ralph E. Smith

(57) ABSTRACT

A power device for use in a vehicle includes a housing, a voltage converter, and a charge-storing device. The housing carries the voltage converter and the charge-storing device. The voltage converter includes a circuit that converts a power signal having a first voltage level to a second voltage level. The charge-storing device electrically couples with the voltage converter and stores the power signal having the second voltage level.

16 Claims, 2 Drawing Sheets

POWER DEVICE FOR A VEHICLE

FIELD OF THE INVENTION

This invention relates generally to power devices and, in particular, to power devices in vehicles for storing and converting electrical energy.

BACKGROUND OF THE INVENTION

Electric vehicles, hybrid electric vehicles, and fuel cell vehicles commonly have a high-voltage power source such as a high-voltage storage device or a high-voltage fuel cell. The high-voltage power source provides electrical energy to power an electric machine such as a motor to propel the vehicle. In the case of hybrid electric vehicles, the electric machine may also act as a generator to charge the high-voltage storage device.

The high-voltage power source may provide a DC voltage much higher than traditional automotive voltages. Most electrical devices in these vehicles are designed to work with more traditional automotive voltages, such as between about twelve and fourteen volts, and will not work with DC voltage from the high-voltage power source. Some modern electrical devices may work with newer voltage standards such as forty-two and forty-eight volt standards, but the high-voltage power source still contains higher voltages than even the newer voltage standards. Therefore, many vehicles cable a DC/DC converter to the high-voltage storage device to provide power to electrical devices in the vehicle. In some cases, the DC/DC converter may also cable to a battery having a traditional automotive voltage. This arrangement requires space to store the DC/DC converter in the vehicle and requires cabling to go between the DC/DC converter and the two power sources.

SUMMARY OF THE INVENTION

A power device for a vehicle includes a housing, a voltage converter carried by the housing, and a charge-storing device carried by the housing. The voltage converter converts a power signal having a first voltage to a second voltage. The charge-storing device electrically couples with the voltage converter and stores the power signal having the second voltage level.

In one implementation, the voltage converter and charge-storing device are carried by the same housing and that housing may have a size or volume similar to the size or volume of a standard automotive battery. In this manner, the power device can be installed in the same space within a vehicle as a standard battery. More than one voltage converter and charge-storing device can be utilized, and each of them can be carried by or received in a common housing, if desired. The power device may also include one or more connectors or connection posts to electrically communicate the voltage regulator and/or the charge-storing device with other components of the power system.

BRIEF DESCRIPTION OF THE DRAWINGS

The following detailed description of preferred implementations and best mode will be set forth with regard to the accompanying drawings in which.

DETAILED DESCRIPTION OF PREFERRED IMPLEMENTATIONS

Figure 1:
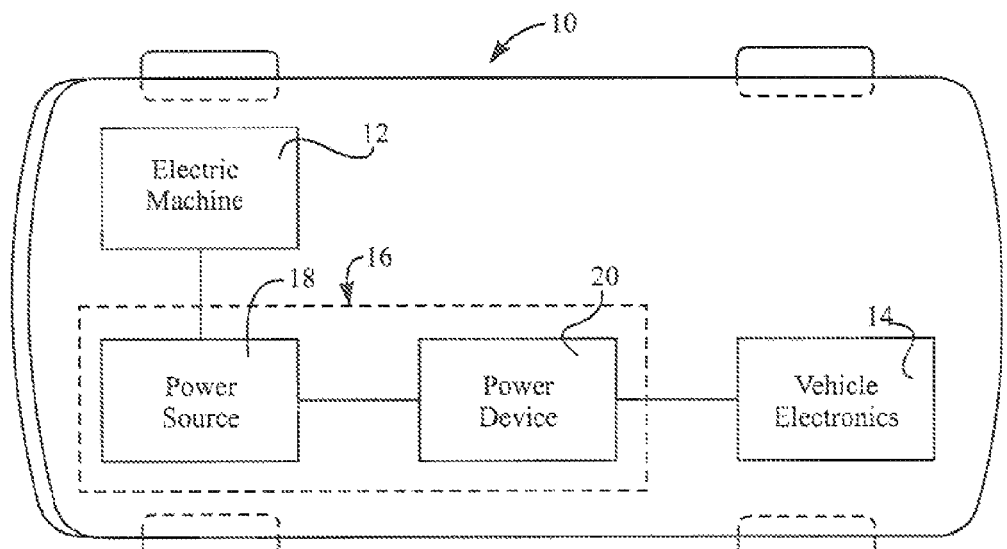
FIG. 1 is a schematic of an implementation of a power system located in a vehicle.

Referring in more details to the drawings, FIG. 1 illustrates a vehicle 10 such as an electric vehicle, a fuel cell powered electric vehicle, or a hybrid electric vehicle. Vehicle 10 includes an electric machine 12 to propel the vehicle, vehicle electronics 14, such as vehicle accessories, electronic modules, and the like, and a power system 16 for providing electrical power for the vehicle.

The electric machine 12 may act as or include a motor to provide propulsion for the vehicle. In the case of a hybrid electric vehicle, the electric machine 12 provides propulsion in conjunction with an internal combustion engine (not shown) and may act as a generator to recharge the power system 16. The electric machine 12 typically requires electrical power to operate. The electric power required is typically several hundred volts.

The vehicle electronics 14 may include various electronic modules, vehicle accessories, and any other devices in the vehicle that may require electric power. Some examples of electronic modules include powertrain controllers, body controllers, safety modules, instrument clusters, telematics units, and the like. Vehicle accessories may include power seats, power windows, power locks, portable devices, and other like devices. The vehicle electronics 14 couple with the power system 16 to receive power required for the electronics. Current vehicle electronics 14 typically require a DC voltage of about twelve to fourteen volts. Other vehicle electronics 14 may require about forty-two or forty-eight volts.

The power system 16 provides electric power for the electric machine 12 and the vehicle electronics 14. The power system 16 includes a power source 18 and a power device 20. Power source 18 may be a high voltage source such as a fuel cell, a flywheel, or a charge storage device. Charge storage devices may include a battery, an ultra capacitor, or other like devices. The power source 18 provides a power signal having a first voltage. The first voltage typically ranges from about sixty volts to over three hundred volts, but may vary depending upon the power source 18. The power source 18 electrically couples with the electric machine 12 and power device 20. In one implementation, the vehicle 10 may include and inverter (not shown) between the electric machine 12 and the power source 18 for converting power between the devices.

Figure 2:
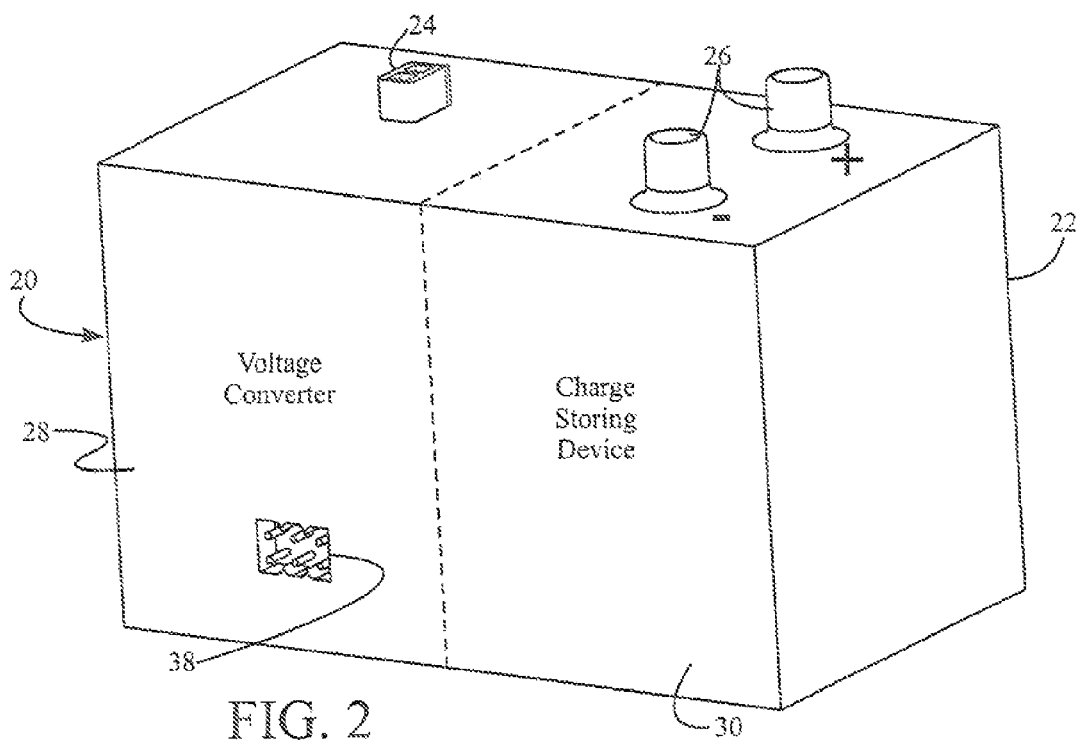
FIG. 2 is a perspective view of an implementation of a power device for use in the power system of FIG. 1.

FIG. 12 shows one exemplary implementation of power device 20. Power device 20 includes a housing 22, a first connector 24, a second connector 26, a voltage converter 28 and a charge-storing device 30. FIG. 2 shows the housing 22 shaped as a rectangular box having four sidewalls, a base, and a top. But the housing may be any shape suitable to fit the power device 20 into a vehicle. In one implementation, the housing 22 may have a size or volume similar to the size or volume of a standard twelve-volt automotive battery to enable the power device to be installed in the same space within the vehicle 10 as a standard battery. For example, many standard automotive batteries have a volume of about 12 or 13 liters. The housing 22 protects the voltage converter 28 and the charge-storing device 30 and may provide a weather-tight seal for the devices inside the housing. The housing 22 may be comprised of any suitable materials such as plastic, metal, rubber and other suitable materials for protecting the voltage converter 28 and the charge-storing device 30.

The first connector 24 provides an electrical connection to the voltage converter 28. The first connector 24 is carried by the housing 22. The first connector 24 may receive a power cable connected to the power source 18 to couple the power device 20 with the power source. As such, the first connector 24 may be any type of power connector suitable for receiving an automotive power cable.

Figure 3:
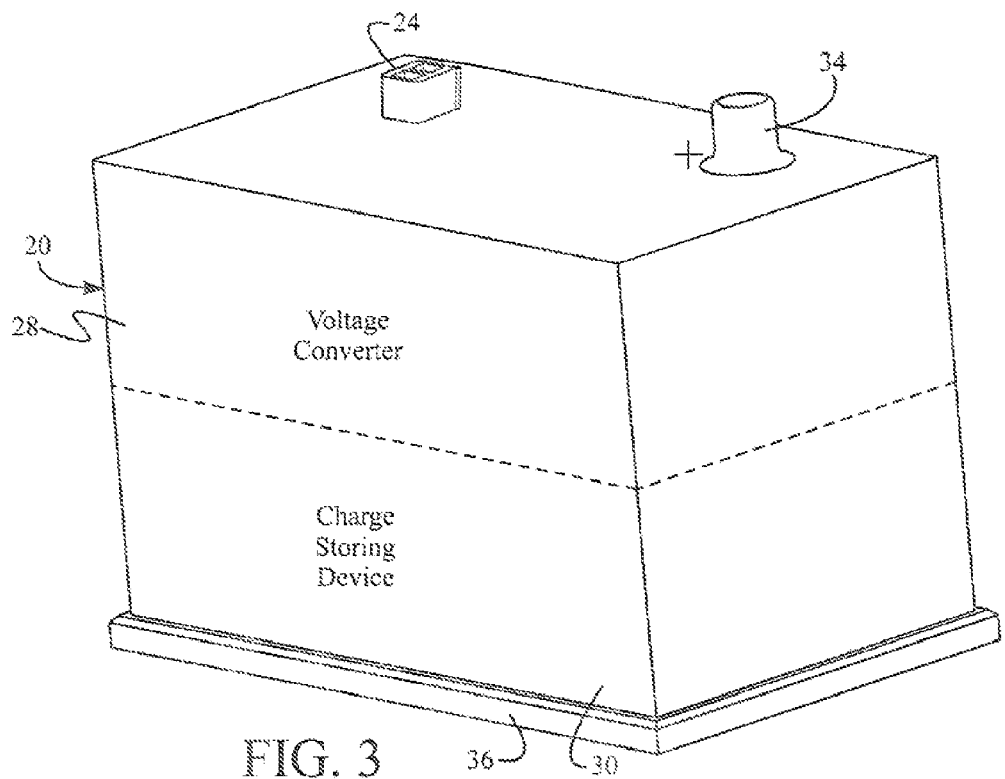
FIG. 3 is a perspective view of a second implementation of the power device for use in the voltage converting system of FIG. 1.

The second connector 26 provides an electrical connection outside of the housing 22 to the charge-storing device 30 and provides connectivity between the charge-storing device 30 and the vehicle electronics 14. FIG. 2 shows the second connector 26 as being a pair of posts for receiving an end of a power cable. The second connector 26, however, may be any suitable connection for providing power to the vehicle electronics 14. FIG. 3 shows an alternative implementation of the second connector 26. In FIG. 3, the second connector 26 contains a positive terminal shown as a post 34 and a negative terminal carried by the housing 22 and represented as a metal plate 36. The metal plate 36 is coupled with the charge-storing device 30 and may be carried anywhere on the housing 22, such as on the sidewall, base, or top of the housing. The metal plate 36 allows the charge-storing device 30 to be coupled with a vehicle ground without requiring cabling between the metal plate and the vehicle ground. When the power device 20 is installed in the vehicle 10, the metal plate 36 can be butted against the frame of the vehicle 10. The metal plate 36 can make electrical contact with the frame of the vehicle 10 and can provide a path to vehicle ground from the charge-storing device 30. Thereby, the metal plate 36 can reduce the cabling required to connect the charge-storing device 30 to vehicle ground. The metal plate 36 may also provide connectivity for a heat sink to cool the power device 20. The heat sink could be a liquid cooled heat sink, an air-cooled heat sink, and the like. In one implementation, the body of the vehicle 10 may make contact with the metal plate 36 and act as a heat sink for the power device 20.

FIGS. 2 and 3 show alternative arrangements for the voltage converter 28 and the charge-storing device 30 within the housing 22. FIG. 2 shows the voltage converter 28 located next to the charge-storing device 30 in the housing 22 with first connector 24 located above the voltage converter 28 and the second connector 26 located above the charge-storing device 30. In comparison, FIG. 3 shows the voltage converter 28 located above the charge-storing device 30. Alternatively, the charge-storing device 30 can be located above the voltage converter 28. Other configurations can also be possible.

FIG. 2 also shows an optional third connector 38 carried by the housing 22. The third connector 38 may couple with the charge-storing device 30 and/or the voltage converter 28. The third connector 38 can provide electrical connections to the power device 20 for communication with the vehicle electronics 14. The third connector 38 can include terminals to couple the power device 20 with a vehicle communication bus such as a CAN Hi bus, CAN Lo bus, or any other suitable vehicle buses. The bus connection can provide the vehicle electronics 14 with the ability to monitor the power device 20 and ensure that the power device is working properly. The bus connection on the third connector may also enable the vehicle electronics 14 to provide information to the power device 20, such as notice of a system fault. The third connector 38 can also include a terminal for providing a wakeup signal to the voltage converter 28. The wakeup signal can initiate the power device 20 to provide power to the vehicle electronics 14. The third connector can also include a terminal for receiving a control signal such as an interlock loop signal. The interlock loop signal can provide a safety feature to instruct the power device 20 to shut off in the case of a system fault, such a cut cable, short circuit, power failure, or the like.

Figure 4:
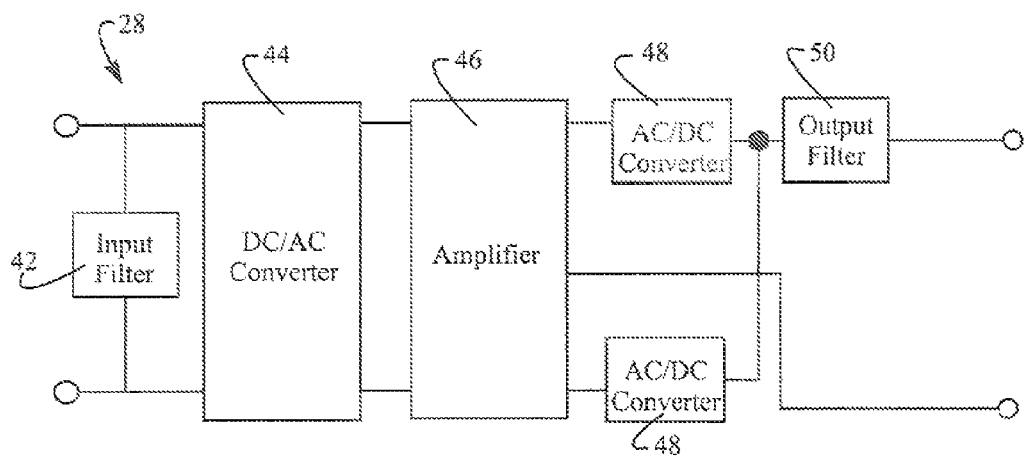
FIG. 4 is a schematic of an implementation of the power device of FIG. 2.

FIG. 4 shows one exemplary implementation of the voltage converter 28. The voltage converter 28 receives a first voltage and converts it to a second voltage. The voltage converter 28 can include an input filter 42, a DC/AC converter 44, an amplifier 46, an AC/DC converter 48, and an output filter 50. The input filter 42 can include one or more capacitors located in parallel with the first connector 24 to filter the first voltage.

The DC/AC converter 44 is coupled with the input filter 42 to receive the first voltage from the first connector 24 and may convert the first voltage from a DC voltage to an AC voltage. The DC/AC converter 44 may be any one of a number of DC to AC converter types. For example, the DC/AC converter may be a chopper device that converts DC signals to AC signals. One example of a chopper is a full bridge circuit having a metal oxide semi-conductor field effect transistor (MOSFET) located on each leg of the full bridge circuit. Each MOSFET may be coupled with a diode. Many other types of DC/AC converters may also be possible.

The amplifier 46 couples with the output of the DC/AC converter 44 to receive the AC voltage and modify the amplitude of the AC voltage. In one implementation, the amplifier 46 is a transformer. The transformer 46 may have at least one primary winding and at least one secondary winding. The transformer's winding ratio converts the voltage level of the first voltage to the second voltage. For example, the transformer may step down a three hundred volt signal to a twelve-volt signal. Alternatively, the transformer 46 may be a voltage step up device used to increase the voltage level of the first voltage to the second voltage. The transformer 46 may also provide isolation between the first voltage and the second voltage.

The AC/DC converter 48 is coupled with the amplifier 46 and may convert the second voltage from an AC voltage to a DC voltage. The AC/DC converter 46 may be a rectifier such as a half wave rectifier or a full wave rectifier, and may include any number of devices such as diodes, vacuum tubes, MOSFETs, controllable power switches, and other such devices. Other types of AC/DC converters may also be used as shown in FIG. 4, one or more AC/DC converters 48 may be present in the voltage converter to convert the AC voltage into the DC voltage. For example, if the amplifier 46 is a transformer having two secondary windings, an AC/DC converter 48 may couple with each secondary winding to convert AC signal into a DC signal.

The output filter 50 is coupled with the AC/DC converter 48 to reduce distortion such as EMC noise, current ripples, voltage ripples, and the like on the second voltage. The output filter 50 may include an inductor and/or a capacitor. The capacitor is typically several micro Farads and stores only enough charge to provide a brief transient voltage.

In one implementation, the voltage converter 28 may convert the first voltage to the second voltage, but not vice versa. For example, voltage received at the first connector 24 is converter to an AC signal, amplified or de-amplified, converted back to a DC signal, filtered, and provided to the charge-storing device 30. In another implementation, the voltage converter 28 may be a bi-directional voltage converter. The bi-directional voltage converter may receive a DC voltage from the power source 18 or the charge-storing device 30. The bi-directional voltage converter is able to convert the DC voltage to an AC voltage, amplify or de-amplify the AC voltage using the amplifier 46, and convert the resulting voltage back to a DC voltage. Utilizing a transformer as the amplifier 46 enables the transformer to step up the voltage received from the power source 18 or the charge-storing device 30 and step down the voltage received from the other. For example, if the power source 18 is a high voltage device, the voltage converter 28 can convert the high voltage from the power source 18 into a low voltage for recharging the charge-storing device 30. Conversely, a bi-directional voltage converter may recharge the power source 18 by amplifying voltage from the charge-storing device 30 and providing the amplified voltage to the power source 18.

To provide sufficient power to recharge the power source 18, the charge-storing device 30 may be connected to a power system on another vehicle to supply power from the other vehicle to the charge-storing device, convert the power, and provide the converted power to recharge the power source. Moreover, the DC/AC converter 44 and the AC/DC converter 48 can be bi-directional. For example, the DC/AC converter 44 may convert a DC voltage to an AC voltage when current flows in one direction, and convert an AC voltage to a DC voltage when current flows in the opposite direction.

Additional implementations of the voltage converter 28 are also possible. For example, the DC/AC converter 44, the amplifier 46, and the AC/DC converter 48, may be substituted with a simple voltage amplifier, such as an operational amplifier circuit, to amplify or de-amplify the first voltage. Furthermore, the voltage converter 28 may be any of several types of voltage converters including buck, boost, buck-boost, inverting, forward, fly back, push-pull, half bridge, full bridge, or any other such types of converters.

The charge-storing device 30 couples with the voltage converter 28 to store charge converted by the voltage converter. The charge-storing device 30 may be any number of devices such as a battery, an ultra-capacitor, or any other device that can store enough charge to provide steady-state power to the vehicle electronics 14 for several minutes or up to several hours. In one implementation, the charge-storing device 30 is an automotive battery capable of storing about twelve volts. In another implementation, the charge-storing device 30 is capable of storing charge of about forty-two volts. Alternatively, the charge-storing device 30 may be enabled to store any suitable voltage for the vehicle electronics 14. In another implementation, the charge-storing device is an ultra capacitor with a capacitance of several Farads up to many thousands of Farads.

Providing the charge-storing device 30 and the voltage converter 28 in the same housing 22 may provide several advantages. For example, having both the voltage converter 28 and charge-storing device 30 in the same housing simplifies installation of the power device 20 in the vehicle 10 and eliminates external connections between the voltage converter and the charge-storing device.

Additionally, the output filter 50 may be simplified by placing the charge-storing device 30 in the housing 22 with the voltage converter 28. For example, the output filter 50 may not require any capacitor coupled with the inductor due to the inherent capacitance of the charge-storing device 30. Alternatively, if a capacitor is required for the output filter 50, the size and/or number of capacitors is likely to be reduced due to the capacitance of the charge-storing device 30 and the lack of cabling required between the charge-storing device 30 and the voltage converter 28.

Moreover, locating the charge-storing device 30 near the voltage converter 28 may reduce the necessary size of the charge-storing device and may allow the power device 20 to be sized similar to that of a standard 12-volt automotive battery. As a result, the power device 20 may be placed in locations in the vehicle designed for storing a standard automotive battery.

While certain preferred embodiments have been shown and described, persons of ordinary skill in the art will readily recognize that the preceding description has been set forth in terms of description rather than limitation, and that various modifications and substitutions can be made without departing from the spirit and scope of the invention. The invention is defined by the following claims.

The invention claimed is:

1. A power device in combination with a vehicle electrical system comprised of a plurality of vehicle electronics and a power source electrically coupled with an electric machine of a vehicle to provide power to the electric machine, comprising:
 a housing installed within the vehicle;
 a voltage converter comprising an AC/DC converter and a DC/AC converter contained within the housing electrically coupled to the power source, wherein the voltage converter converts an electrical power signal having a first voltage greater than a voltage suitable for powering the plurality of vehicle electronics to electrical power having a second voltage lower than the first voltage and that is suitable for powering the plurality of vehicle electronics, and wherein the voltage converter is operable to reduce the voltage of the power signal from the first voltage to the second voltage, and is operable to convert a voltage from the charge-storing device from the second voltage to the first voltage;
 a charge-storing device contained within the housing and electrically coupled with the voltage converter storing electrical charge from the electrical power at the second voltage and providing steady-state electrical power to the vehicle electrical system for powering the plurality of vehicle electronics;
 wherein the power device and power source comprises a vehicle power system; and
 wherein the housing encloses the voltage converter and the charge-storing device together within the housing, has a size or volume of a standard automotive battery, and is installed in the same space within the vehicle in which a standard automotive battery is installed.

2. The power device of claim 1, wherein the housing comprises a weather-tight seal that protects the voltage converter and charge-storing device, and further comprising a metal plate located on the bottom of the housing providing an electrical connection between the charge-storing device and vehicle ground.

3. The power device of claim 2, wherein the metal plate contacts a part of the vehicle chassis providing a heat sink therefor.

4. The power device of claim 1, wherein the first voltage is greater than twice the voltage of the second voltage.

5. The power device of claim 1, wherein the voltage converter further comprises a transformer.

6. The power device of claim 1, wherein the charge-storing device is operable to provide power to the electronics for at least several minutes.

7. The power device of claim 1, wherein the charge-storing device comprises a twelve volt or forty-two volt battery.

8. The power device of claim 1, wherein the charge-storing device comprises an ultra capacitor.

9. A power device in combination with vehicle electronics and a power source electrically coupled with an electric machine of a vehicle, comprising:
 a housing installed within the vehicle;
 a first connector carried by the housing and electrically coupling the power device to the power source;

a voltage converter within the housing and electrically coupled with the first connector, the voltage converter comprising an AC/DC converter and a DC/AC converter;

a charge-storing device within the housing and electrically coupled with the voltage converter for storing electrical charge with the charge-storing device capable of holding enough charge to provide steady state electrical power to the vehicle electronics for several minutes;

a second connector carried by the housing and electrically coupling the charge-storing device with the vehicle electronics;

a third connector carried by the housing and electrically coupled with the power device connecting the power device with a vehicle communications bus configured to enable monitoring of the power device, to enable the vehicle electronics to provide information to the power device, to enable a wakeup signal to be provided to the voltage converter, or to enable a control signal to be provided to the power device;

wherein the voltage converter receives an electrical power signal from the power source having a first voltage at the first connector, converts electrical power from the first voltage into electrical power having a second voltage, and provides electrical power at the second voltage to the charge-storing device; and wherein the housing has a size or volume of a standard twelve volt automotive battery, encloses the voltage converter and charge-storing device together within the housing, and is installed in the same space within the vehicle in which a standard twelve volt automotive battery is installed.

10. The power device of claim 9, wherein the second connector comprises a pair of posts located on the exterior of the housing.

11. The power device of claim 9, wherein the second connector comprises a metal plate located on the exterior of the housing to provide an electrical connection to the charge-storing device.

12. The power device of claim 9, wherein the power signal is a DC voltage signal.

13. The power device of claim 9, wherein the first voltage is greater than double the voltage of the second voltage.

14. The power device of claim 9, wherein the voltage converter reduces the voltage of the power signal from the first voltage to the second voltage.

15. The power device of claim 9, wherein the voltage converter is operable to reduce the voltage of the power signal from the first voltage to the second voltage, and is operable to convert a voltage from the charge-storing device from the second voltage to the first voltage.

16. A power system for providing power in a vehicle, comprising:

a power source generating a power signal having a first DC voltage;

a power device electrically coupled to the power source, the power device comprising:

a housing installed within the vehicle;

a connector carried by the housing and adapted for coupling the power device to the power source;

a voltage converter within the housing and electrically coupled with the first connector, the voltage converter comprising an AC/DC converter and a DC/AC converter; and a charge-storing device within the housing and electrically coupled with the voltage converter;

wherein the voltage converter receives the first DC voltage from the power source, converts the first DC voltage to a second DC voltage, and provides the second DC voltage to the charge-storing device storing charge from the second voltage enabling the stored charge to be provided as a source of electrical power for vehicle electronics; and wherein the housing has a size or volume of a standard twelve volt automotive battery, encloses the voltage converter and charge-storing device together within the housing, and is installed in the same space in which an automotive battery would be installed in the vehicle.

* * * * *